US008630399B2

United States Patent
D'Arcy et al.

(10) Patent No.: US 8,630,399 B2
(45) Date of Patent: Jan. 14, 2014

(54) METHOD AND SYSTEM FOR MANAGING A CONTACT CENTER CONFIGURATION

(76) Inventors: Paul D'Arcy, Caherconlish (IE); Seamus Hayes, Oranmore (IE); Neil O'Connor, Galway (IE)

( * ) Notice: Subject to any disclaimer, the term of this patent is extended or adjusted under 35 U.S.C. 154(b) by 457 days.

(21) Appl. No.: 12/895,735

(22) Filed: Sep. 30, 2010

(65) Prior Publication Data
US 2012/0082303 A1 Apr. 5, 2012

(51) Int. Cl.
*H04M 3/42* (2006.01)
(52) U.S. Cl.
USPC ............. 379/201.02; 379/201.01; 379/265.01
(58) Field of Classification Search
USPC ............. 379/201.01, 201.02, 265.01–265.14
See application file for complete search history.

(56) References Cited

U.S. PATENT DOCUMENTS

| | | | |
|---|---|---|---|
| 7,869,586 B2 * | 1/2011 | Conway et al. .......... 379/265.06 |
| 8,094,803 B2 * | 1/2012 | Danson et al. ........... 379/265.02 |
| 8,364,519 B1 * | 1/2013 | Basu et al. .................... 705/7.38 |
| 2003/0163380 A1 * | 8/2003 | Vaccarelli et al. .............. 705/26 |
| 2004/0117220 A1 * | 6/2004 | Chess et al. ....................... 705/7 |
| 2004/0143436 A1 * | 7/2004 | Huang et al. .................. 704/257 |
| 2007/0073651 A1 * | 3/2007 | Imielinski .......................... 707/3 |
| 2009/0052635 A1 * | 2/2009 | Jones et al. ................ 379/88.02 |
| 2009/0171729 A1 * | 7/2009 | Anisimov et al. ................. 705/8 |
| 2009/0182756 A1 * | 7/2009 | Kang et al. ..................... 707/102 |
| 2011/0206198 A1 * | 8/2011 | Freedman et al. ....... 379/265.03 |
| 2012/0059849 A1 * | 3/2012 | Yehaskel et al. .............. 707/772 |
| 2013/0022179 A1 * | 1/2013 | Anisimov et al. .......... 379/88.01 |

* cited by examiner

*Primary Examiner* — William Deane, Jr.
(74) *Attorney, Agent, or Firm* — Kacvinsky Daisak PLLC; John Maldjian, Esq.; Alexander D. Walter, Esq.

(57) ABSTRACT

A system for adapting a contact center configuration in order to achieve a specific business goal is provided. The system comprises a display for displaying to a user a representation of an actual state of a performance metric of the contact center, an interactive tool for enabling the user to interact with and thereby modify the representation of the performance metric to a desired state, and a computation engine. The computational engine is arranged to determine a measure of the modification of the representation and to identify at least one contact center configuration parameter, which if adjusted, results in an update of the actual state of the performance metric which more closely approaches the desired state represented by the modification.

14 Claims, 6 Drawing Sheets

Skillsets Available:

| | | | | | | |
|---|---|---|---|---|---|---|
| 74 → Languages | Spanish | English | French | Japanese | | |
| 76 → OS | Win2k | WinNT | Win98 | Win95 | MacOS | Linux |
| 78 → Packages | MSOffice | LotusNotes | Claris | | | |
| 80 → TechIssues | Ethernet | Modems | ISDN | ADSL | | |
| 82 → Manufacturers | Dell | HP/Compaq | Gateway | | | |

Agent ID: 120 74
Agent ID: 121 74
Agent ID: 122
Agent ID: 123

| | | | | | | |
|---|---|---|---|---|---|---|
| Languages | Spanish Y | English Y | French N | Japanese N | | |
| OS | Win2k N | WinNT N | Win98 Y | Win95 Y | MacOS N | Linux Y |
| Packages | MSOffice Y | LotusNotes Y | Claris N | | | |
| TechIssues | Ethernet Y | Modems Y | ISDN N | ADSL N | | |
| Manufacturers | Dell Y | HP/Compaq Y | Gateway N | Mac N | | |

Fig. 4

Agent Status: 76

| ID | In/Out? | Ready? | Calls in Queue | Available in |
|---|---|---|---|---|
| 120 | In | No | 3 | 12 mins |
| 121 | In | No | 6 | 22 mins |
| 122 | Out | No | 0 | - |
| 123 | In | Yes | 4 | 13 mins |

Fig. 5

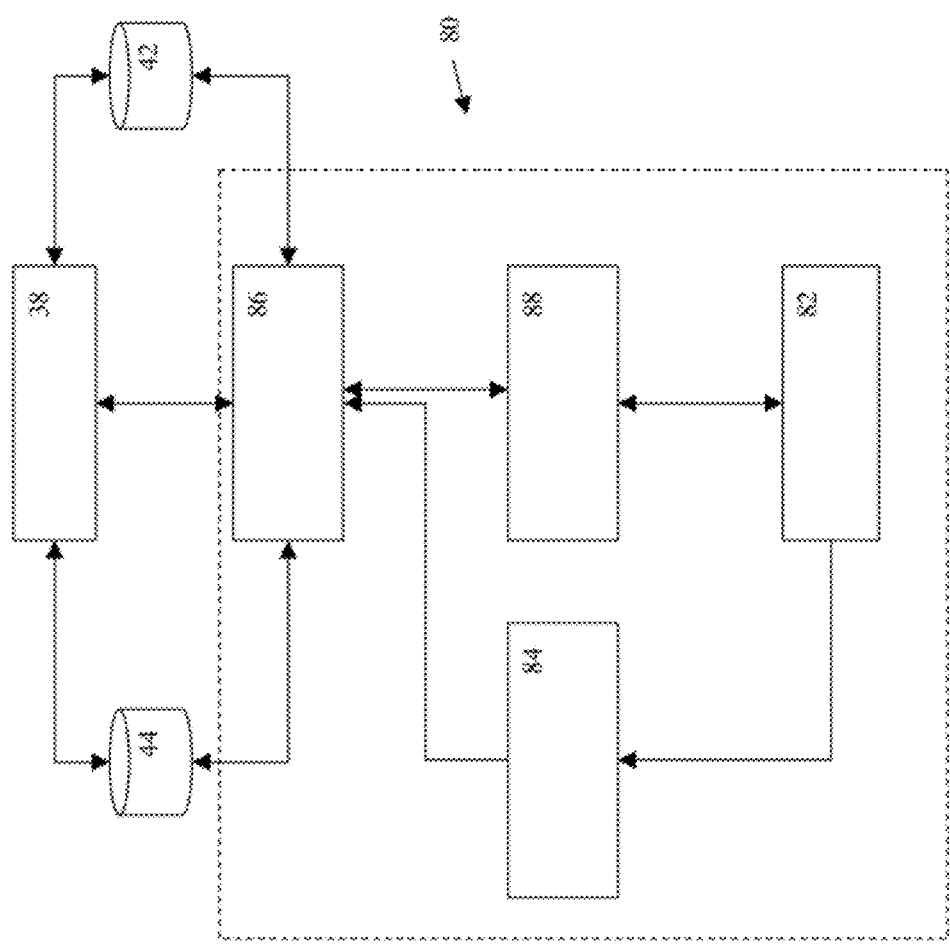

METHOD AND SYSTEM FOR MANAGING A CONTACT CENTER CONFIGURATION

BACKGROUND OF THE INVENTION

1. Field of the Invention

The present invention relates to a method and system for managing a contact center configuration, and in particular, a platform for adapting a contact center configuration in order to achieve specific business goals of the contact center.

2. Description of Related Art

Contact centers are widely used to allow an enterprise or business to handle customer enquiries, complaints and support, and to allow an enterprise to make contact with existing or potential customers.

Meeting the needs of the customers in a timely and efficient manner is paramount to a successful and profitable contact center. The efficiency of operation of a contact center correlates directly with the contact center configuration including, for example, a number of agents available at any time to service customer contacts of a given type or class, the skillsets associated with those agents, queuing mechanisms employed for making routing decisions with respect to the received contacts, IVR systems and their implementation, etc.

For example, call quality and call time, (i.e., a duration of time in which an agent is engaged with a contact) might be improved by ensuring a customer contact is assigned to an agent having the necessary skillset to deal with the subject matter of the contact, as opposed to simply assigning the contact to any available agent. The subject matter of the contact might be gleaned from information acquired during an interactive voice response (IVR) session, by directing the contact first to an automated system, or by accessing customer profile information in a CRM system based on calling line ID for a traditional telephony call, or for example by login ID for a contact that originates from a web browser.

Furthermore, queuing time might be improved by ensuring a sufficient number of agents having the necessary skillsets are available during a predicted period of high volume contacts. For example, if a product, for example, a smart phone, is launched and a problem is identified with the product, it can be predicted that the volume of customer contacts to the contact center will drastically increase, requiring an increased number of agents equipped to deal with the technicalities associated with the problem in order to ensure the smooth operation of the contact center and satisfied customers.

Thus, the financial success or otherwise of a contact center is directly related to the operational management and performance of the contact center.

Individuals within an enterprise such as financial analysts or executives, when assessing the market value or performance of a contact center are often unfamiliar with the intricate interdependencies that exist between features of the contact center configuration, such as skillset assignments, automatic call distribution configuration, hold time, abandon rate, time in queue, average speed of answer.

Such individuals rather are generally interested in obtaining statistics that provide a financial indicator of the contact center's operation, such as customer satisfaction, sales attempts, cost per sale, and revenue per sale represent the performance of a sales contact center, for example.

Various reporting solutions available today make an effort to abstract the reporting and configuration complexity for a customer's benefit. For example, there are in existence, software tools that show how certain treatments (music, announcements, etc.) can affect an abandoned rate. A person having operational knowledge of the contact center therefore has the ability to run such reports and modify the treatments with a view to improving the abandon rate. However, these solutions do not remove all the layers of expertise required to abstract the low level configuration of the contact center from the needs of the business operating the contact center.

Thus, there is a need for a system and method for enabling an adaptation of a contact center configuration to achieve specific business goals.

SUMMARY

According to an embodiment of the present invention, there is provided a system for adapting a contact center configuration in order to achieve a specific business goal, the platform comprising: a display for displaying to a user a representation of an actual state of a performance metric of the contact center; an interactive tool for enabling the user to interact with and thereby modify the representation of the performance metric to a desired state; and a computation engine arranged to: determine a measure of the modification of the representation; identify at least one contact center configuration parameter, which if adjusted, will result in an update of the actual state of the performance metric which more closely approaches the desired state represented by the modification.

In one embodiment, the computational engine is further arranged to update the representation of the actual state of the performance metric, which more closely approaches the desired state represented by the modification.

An embodiment of the present invention provides a system to enable a person with little or no knowledge of the complex statistics and configuration parameters in a contact center, to adjust a representation of a performance metric of the contact center, for example, a graphical depiction of the number of calls with specified parameters that resulted in a sale, to achieve a specific business goal, for example, to increase the conversion rate. Based on the adjusted representation, the computational engine calculates a modification to a parameter of the contact center configuration, for example, the number of agents skilled in both sales and technical support, which if implemented, would cause the contact center performance metric to approach the desired business goal, i.e., increased sales.

In another embodiment, the computation engine is further arranged to determine the adjustment of the contact center configuration parameter required to cause the actual state of the performance metric to more closely approach the desired state represented by the modification.

In an embodiment, the display depicts at least one boundary, which limits the modification of the representation beyond the boundary. In this way, limits can be placed on the permissions of the user to alter the configuration of the contact center. For example, a boundary might preclude the user from reducing the number of agents assigned to a given skillset to below ten. Should a user interact with the interactive tool to attempt to extend the representation beyond the boundary, pop up advice might be displayed, indicating to the user that such a modification is prohibited and providing possible changes that might result in such modifications being allowed, for example, a need to hire more agents, a need to increase incoming call rate (such as by increasing advertising), a need to add more IVR channels etc. The boundary does not need to represent the actual bounds of the contact center configuration, but may be set at differing levels depending on requirements or preferences of the contact center.

In an embodiment, the computation engine is arranged to adjust the contact center configuration parameter to cause the actual state of the performance metric to more closely approach the desired state represented by the modification.

In an embodiment, the system further comprises a user interface for receiving requests from the user relating to the specific business goal, wherein the representation of the actual state of the performance metric of the contact center is associated with the request.

In an embodiment, the system further comprises a statement analyser, wherein the statement analyser is arranged to receive the request from the user interface and to parse the request to identify a set of keywords.

In an embodiment, the system further comprises a keyword analyser, wherein the keyword analyser is arranged to receive the set of keywords from the statement analyser, and to fetch data associated with the keywords.

For example, if the user were to query "the number of email queries converted into significant sales compared with the number of call queries converted into significant sales", the statement analyser would parse the request to identify a set of keywords, for example, {"email queries", "converted", "significant sale", "call queries", "converted" "significant sales"}. In this instance, the first three keywords of the set are associated with one another and the last three keywords are associated with one another. The statement analyser forwards the set of keywords to the keyword analyser, which firstly qualifies or translates ambiguous terms, for example "significant sales", and associates them with a defined meaning, for example, sales in excess of $100. The keyword analyzer then fetches required information and statistics and forwards the necessary data to the computational engine for processing.

In one embodiment, the data is fetched from at least one of a contact center configuration database, a customer relationship management database, and a reporting and statistics function.

In an embodiment, the data is provided to the computation engine to facilitate the determination of the representation of the performance metric.

In an embodiment, the computation engine is arranged to render the representation of the actual state of the performance metric for display to the user.

In an embodiment, the keyword analyzer is arranged to receive the at least one contact center configuration parameter and the adjustment required from the computational engine, and to modify the contact center configuration accordingly.

In accordance with another embodiment of the present invention, there is provided a computer-implemented method of adapting contact center configuration in order to achieve a specific business goal, the method comprising: displaying to a user, a representation of an actual state of a performance metric of the contact center; and responsive to the user interacting with and modifying the representation, determining a measure of the modification of the representation to a desired state; and identifying at least one contact center configuration parameter, which if adjusted, will result in an update of the actual state of the performance metric which more closely approaches the desired state represented by the modification.

In another embodiment of the present invention, there is further provided a computer program product comprising a non-transitory computer readable medium encoded with computer executed instructions, which when executed in a computing device, is arranged to carry out the following steps: display to a user, a representation of an actual state of a performance metric of the contact center; responsive to the user interacting with and modifying the representation to a desired state, determine a measure of the modification of the representation; and identify at least one contact center configuration parameter, which if adjusted, will result in an update of the actual state of the performance metric which more closely approaches the desired state represented by the modification.

Further benefits and advantages of the present invention will become apparent from a consideration of the following detailed description given with reference to the accompanying drawings, which specify and show embodiments of the invention.

BRIEF DESCRIPTION OF THE DRAWINGS

In order to show how the invention may be carried into effect, embodiments of the invention are now described below by way of example only and with reference to the accompanying figures in which:

FIGS. 3, 4 and 5 provide additional detail regarding the information recorded in components of the record of FIG. 2;

FIG. 6 is a platform of the contact center of FIG. 1, according to the preferred embodiment of the present invention;

Figure 1:
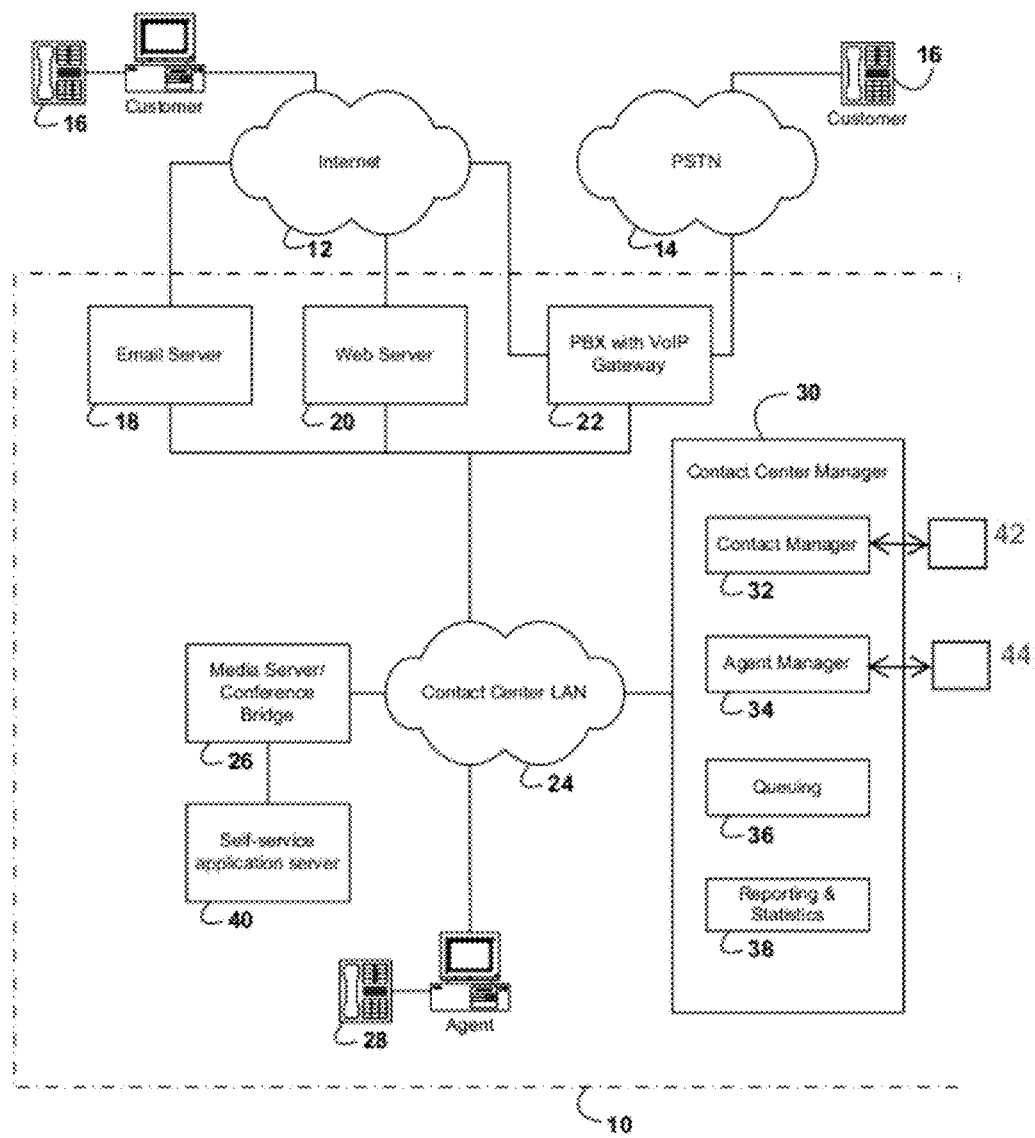
FIG. 1 is a block diagram showing the architecture of a contact center and its environment.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

Embodiments of the present invention are described below by way of example only. These examples represent the best ways of putting the invention into practice that are currently known to the Applicant although they are not the only ways in which this could be achieved.

In FIG. 1 there is indicated, generally at 10, a contact center which is connected both to the Internet 12 and to the public switched telephone network (PSTN) 14. Customers 16 can connect via either the Internet or the PSTN to the contact center generally, and in particular can connect to an email server 18, a web server 20 or (most usually) a private branch exchange (PBX) 22 equipped with a voice over Internet protocol (VOIP) gateway and/or a video interface.

The contact center 10 has a local area network (LAN) 24, which connects each of the servers 18, 20, 22 with a media server/conference bridge 26. A plurality of agents 28 (one of whom is indicated in FIG. 1) are also connected using an agent workstation which is a personal computer equipped with agent client software providing multimedia capabilities to the contact center LAN.

It is to be understood that agents may be connected also to the contact center via the Internet 12 or via a wide area network, and they can also be connected over the PSTN. Such distributed contact center architectures are well known and the present invention is not limited to any particular architecture of contact center.

Customers contact the contact center by, for example, making a voice or video call over the Internet or the PSTN, which is handled by the PBX 22. Customers can also make contact by a chat session hosted on the web server 20.

In addition to such "live" contact sessions, with which the present invention is primarily concerned, it can be seen that the contact center can also receive submissions from web forms hosted on the web server 20, or from a customer email which is received at the email server 18.

In any event, when a live contact such as a voice or video call or a chat session request is received at the respective server, a contact center manager 30 is notified of the existence of a new contact.

The contact center manager 30 performs a number of functions, some of which are indicated generically such as a contact manager 32, an agent manager 34, a multimedia queue, MMQ manager 36 and a reporting and statistics function 38. As the skilled person will appreciate, each of these functions is typically implemented by appropriate software elements operating on a computer system (not shown) forming part of an overall contact center management application. Such software transforms a general purpose computer or server into a contact center management system. This does not exclude the possibility that a contact center manager can be implemented purely in hardware or as a hybrid.

The contact manager 32 generates a new contact entity which records details of the received contact such as the time it was received, its source, any customer details which can be deduced based on the source (e.g. the caller line ID or an IP address), and the nature of the contact (e.g. customers may have access to a first communication channel for sales or a second communication channel for technical support, etc.).

In order to increase the sophistication of the contact handling, the customer is typically directed first through an automated system, such as interactive voice response (IVR) system, to acquire more information, which will allow the contact to be better directed. Again, the skilled person will be familiar with the techniques, which can be used and therefore only a brief description of a typical method of contact handling will be given.

The most common contact type in current contact centers is voice calls, and as indicated above, such calls are initially handled by the PBX. The contact manager 32, following the generation of a contact, instructs the PBX 22 to transfer the call to the media server/conference bridge 26. This bridge effectively generates an ad hoc conference into which the customer's call is placed.

A self-service application server 40 is connected into the same conference and a script is run on the server 40 which plays back various recorded announcements and accepts inputs from the customer in response to such announcements in order to either dispose of the contact (if automated handling can satisfy all of the needs of that particular customer) or to determine the skillset(s) required for an agent to handle the customer. In addition to simple recorded announcement playback, more sophisticated self service applications are increasingly deployed that can interact with the customer and respond to limited customer requests, such as by speaking a customer's bank balance.

In normal operation, the script will allow the customer to navigate through the application either to a point where it has been determined the customer query is satisfied (such as when the customer has heard the account balance) or to a point where it has been determined the customer should be connected to a human agent. Often the latter option is available at any point in the menu structure by pressing a specified key.

When the script has terminated, the information gleaned from this session is passed back to the contact manager to update the contact entity and to more appropriately queue the contact (unless the contact has terminated following either a successful or an unsuccessful navigation of the menu structure provided by the script). When a contact is queued, i.e. unless an agent is available immediately to deal with the contact, the customer will typically be provided with a media feed.

The contact center manager 30 is arranged to maintain records associated with all interactions between customers and agents. In the preferred embodiment, all contact related information is associated with a customer profile and stored in a CRM (customer relationship management) database 42, while all contact center configuration including all information relating to the agents of the contact center is stored in a configuration database 44.

In the preferred embodiment, the contact manager 32 is connected to the CRM database 42. On receipt of a contact, the generated contact entity is associated with a customer profile, which is stored in the CRM database 42. Information, such as the caller line ID or an IP address can be used to reference the customer profile in the CRM database. The customer profile comprises the customer's personal data, such as credit card details and addresses, as well as details relating to all previous contacts made by the customer. The customer profile may also indicate a customer rating, e.g., a silver, gold, or platinum rating. The customer rating may be utilised when determining the manner in which the contact should be dealt with.

In the preferred embodiment of the present invention, the customer profile in the CRM database is effective to act as a set of commands to the MMQ manager 36 to enable the MMQ manager to determine a priority rating for the contact and to identify the skillsets required by an agent in order to successfully deal with the contact. For example, if a customer profile indicates that the customer is a platinum customer, the contact might be assigned a high priority level, and assigned to the next available agent, regardless of the position of other contacts queuing for service.

Contact center configuration data associated with each contact center server is stored as a record 50 (not shown in FIG. 1) in the configuration database 44 connected to and accessible by the agent manager 34.

Figure 2:
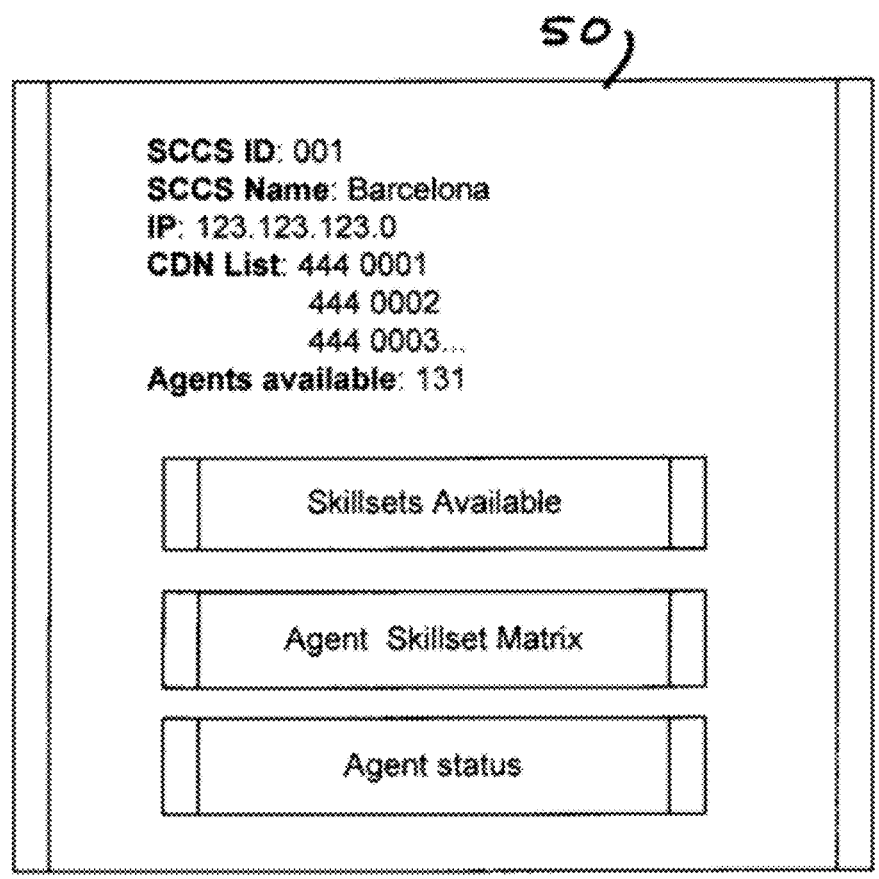
FIG. 2 is an exemplary illustration of the information in a database record generated in response to receipt of a contact at the contact center of FIG. 1.

As illustrated in FIG. 2, the record 50 includes details identifying the contact center (these details are seen in record 50 as the "SCCS ID" and "SCCS name", where SCCS is an abbreviation for the Symposium Contact Center Server product formerly sold by Nortel Networks Limited), the IP or network address of the contact center, a list of controlled directory numbers (CDNs) at which calls arrive at the remote contact center, a total number of agents available at the center, details of the aggregate skillsets at the contact center, the particular skillset matrices for the individual agents of the center, and a current status of each agent.

FIG. 3 shows an example of an aggregate skillset subrecord 72 within record 50. In this simplified example, the skillsets relate to computer technical support, and the skillset therefore lists every language spoken 74 by at least one agent at the remote contact center. It also lists all operating systems 76, relevant software packages 78, particular technical issues 80 and computer manufacturers 82 for which there is an agent with the relevant skills to handle queries.

A similar simplified example is given in FIG. 4 of the skillset matrix for an individual agent at the contact center. Each agent has an associated skillset matrix sub-record 74. In the case of each possible skill, an indicator ("Y" or "N") is provided to denote whether or not that particular agent has the relevant expertise. However, it will be appreciated that instead of a simple Yes/No rating, the proficiency of the agent with each skill could be provided.

FIG. 5 shows a simplified illustration of a portion of an agent status sub-record 76 for a contact center. For each agent, the sub-record notes if the agent is logged in or out, whether the agent status is ready or not ready (to take a new contact), how many queued calls have already been assigned to that agent, and the estimated time in which the agent is expected to become available. It should be noted that Agent No. 123 is shown as being ready despite having calls queued; Agents are normally given a short break between calls, and a particularly important call could be directed immediately to that agent ahead of the other queued calls, if so desired.

Thus, the MMQ manager 36 evaluates the customer profile information, including any updated information gleaned during the IVR process, to determine a priority level associated with the contact and to ascertain the skillsets required to deal with the contact. The MMQ manager 36 then determines from the contact configuration database, resources available to the MMQ manager for routing the contact (e.g. whether any agents are available with the appropriate skillset), and accordingly, arrives at a decision as to how the contact is to be handled. If a number of agents are considered equally skilled to handle a call, then the agent status records allow the MMQ manager 36 to arrive at a determination of the most available agent from this subset. Alternatively, the determination of the most suitable agent can involve a trade-off between differing skill levels and differing availabilities.

The reporting and statistics function 38 of the contact center manager 30 is arranged to calculate and track time-based statistics and success-based statistics across a number of diverse media. To this end, the reporting and statistics function 38 is arranged to access records relating to all activities of the contact center including data associated with the contact center configuration stored in the configuration database 44 as well as the customer profiles of the CRM database 42.

For example, the reporting and statistics function 38 may be arranged to calculate not only an agent's response times, but also, the efficiency of the agent as measured by some metric of success. In a contact center dealing primarily with complaints, the metric may be the customer satisfaction rating when the complaint has been successfully dealt with, as measured by a follow-up survey. In contact centers having sales of a product or service as their primary goal, the metric may be the number of sales or the financial value of sales attributable to the agent, in which case the amount of time spent dealing with a customer will be partly evaluated on the sales achieved. In telemarketing operations the success metric may the proportion of contacts agreeing to receive a sales representative at their premises.

In calculating contact center statistics, the reporting and statistics function 38 may employ configuration data metrics including a total number of agents configured for contact center, a number of agents currently logged in, a number of agents active, a number of agents ready/not ready, a total number of contacts in queue, a longest wait time of queued contacts, a number of contacts connected and a number of contacts on hold, etc.

A contact center, as in any aspect and elemental business structure, needs to be measured and evaluated in order to assist the company in reaching strategic goals. The present invention is directed towards a facility or platform for a business orientated person with little or no knowledge of the complex statistics and configuration parameters in a contact center. The interface is arranged to receive high-level business requests from a user, and to output a coherent high-level response to the user.

Figure 7:
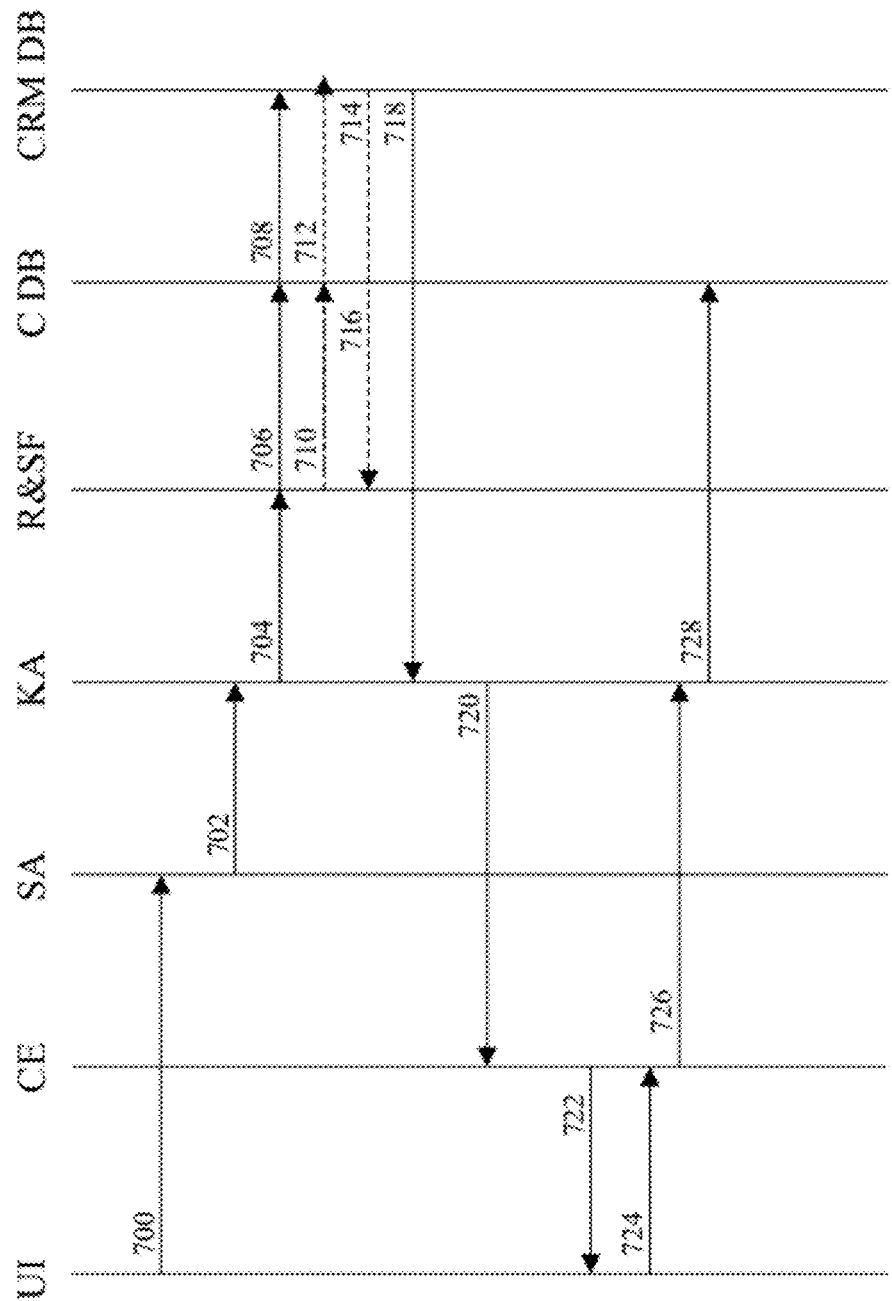
FIG. 7 is a message flow depicting the operation of the platform of FIG. 6.

Referring to FIG. 6, there is illustrated a platform 80 according to the preferred embodiment of the present invention. The operation of the platform is depicted in the message flow of FIG. 7. The following description will refer both to the components 82-86 of the platform 80 in FIG. 6 and the messages 700-728 of the message flow of FIG. 7, as appropriate.

The platform 80 comprises a user interface (UI) 82, arranged to receive a request from a user and to submit 700 the request to a statement analyser (SA) 84.

The statement analyser 84 is a computational knowledge engine arranged to interpret a query and output a response, and in particular, an answer to a question, by carrying out computations based on an internal knowledge base. This function is quite different from a traditional search engine, such as Google, which involves searching the web and returning links deemed relevant to the query—one of which may or may not contain an answer to the question. A typical example of a computational answer engine is the Wolfram-Alpha engine, see www.wolframalpha.com.

For example, a user may input a query or request such as "How many sales enquiries are not being converted into sales" or "Have last months poorly performing agents improved during the current month?"

The statement analyzer 84 parses the request, identifying a set of keywords, which is then sent 702 to a keyword adapter (KA) 86. The statement analyser 84 is preferably further capable of identifying keyword terms and phrases, to thereby convey to the keyword adaptor, an efficient indicator of the request. In the above examples, the sets of keywords identified might be {"how many", "sales enquiries", "not converted"}, and {"last month", "poorly performing agents", "improved", "current month"}, respectively.

The keyword adapter 86 is effectively a translator, which is configured in accordance with a specific contact center in which it is implemented and is arranged to interpret and qualify the set of keywords as they apply to that contact center and to thereby mitigate any ambiguity associated with the keywords. The keyword adapter 86 receives the sets of keywords from the statement analyser 84 and associates the keywords with parameters relating to contact center information.

In the case of the first example, the set of keywords of the request are straightforward and don't require qualification. The keyword adaptor 86 queries the reporting and statistics function 38 of the contact center manager 30 to ascertain a response to the request. The number of sales enquires might be determined from the number of contacts that were identified as having originated from a sales contact number, or a web click-to-call function, or simply from information gleaned during an IVR session.

In the case of the second example, the keyword terms "poorly performing agents" and "improved" require qualification. A "poorly performing agent" might be defined as an agent that has an average hold time, i.e. time spent per contact, of greater than 4 minutes, and an "improved" agent might be defined as one who has reduced their hold time by more than 30 seconds. Alternatively, or in addition, another example of a "poorly performing" agent might be defined as an agent that has not achieved enough sales to meet a threshold, and an "improved" agent might be defined as one who has increased their sales volume by a given percentage. It will be appreciated, however, that an agent identified as poorly performing in one contact center might be deemed satisfactory in another contact center, depending on the business goals and requirements of the contact center.

The keyword adaptor 86 is arranged to query 704, 706, 708, the reporting and statistics function 38, the CRM database 42, and the configuration database 44, respectively, and as necessary, to determine the information required to address the requests received from the user. The reporting and statistics function 38 may also query 710, 712, the CRM database 42, and the configuration database 44 to determine the information requested from it.

On receipt 714, 716, 718, of the information, the keyword adaptor 86 determines and forwards 720 to a computational engine 88, the relevant parameters. The relevant parameters include the sourced information as well as any comparative factors or mathematical operators identified in the request. For example, the business objective that is relevant to the current query might be customer satisfaction rating, in which case the relevant parameters returned could conceivably be "time in queue", "number of transfers between agents" and "average talk time", and the mathematical operators could conceivably be an aggregate of a logarithm function of the product of the third root of the time in queue, and other functions of the two remaining parameters.

Preferably the computational engine 88 is a computational software program based system. In the preferred embodiment, the computational software program used is Mathematica, (http://www.wolfram.com/). Mathematica is a typical software program employed in scientific, engineering, and mathematical fields and other areas of technical computing and is particularly suitable for the computational engine 88 of the present invention due to its superior graphical rendering abilities.

Once the necessary information has been aggregated and a response to the request determined, the computational engine forwards 722 a response to the user, where it is preferably displayed on a screen associated with the user interface 82. In the preferred embodiment, the response is displayed in a graphical format.

Figure 8:
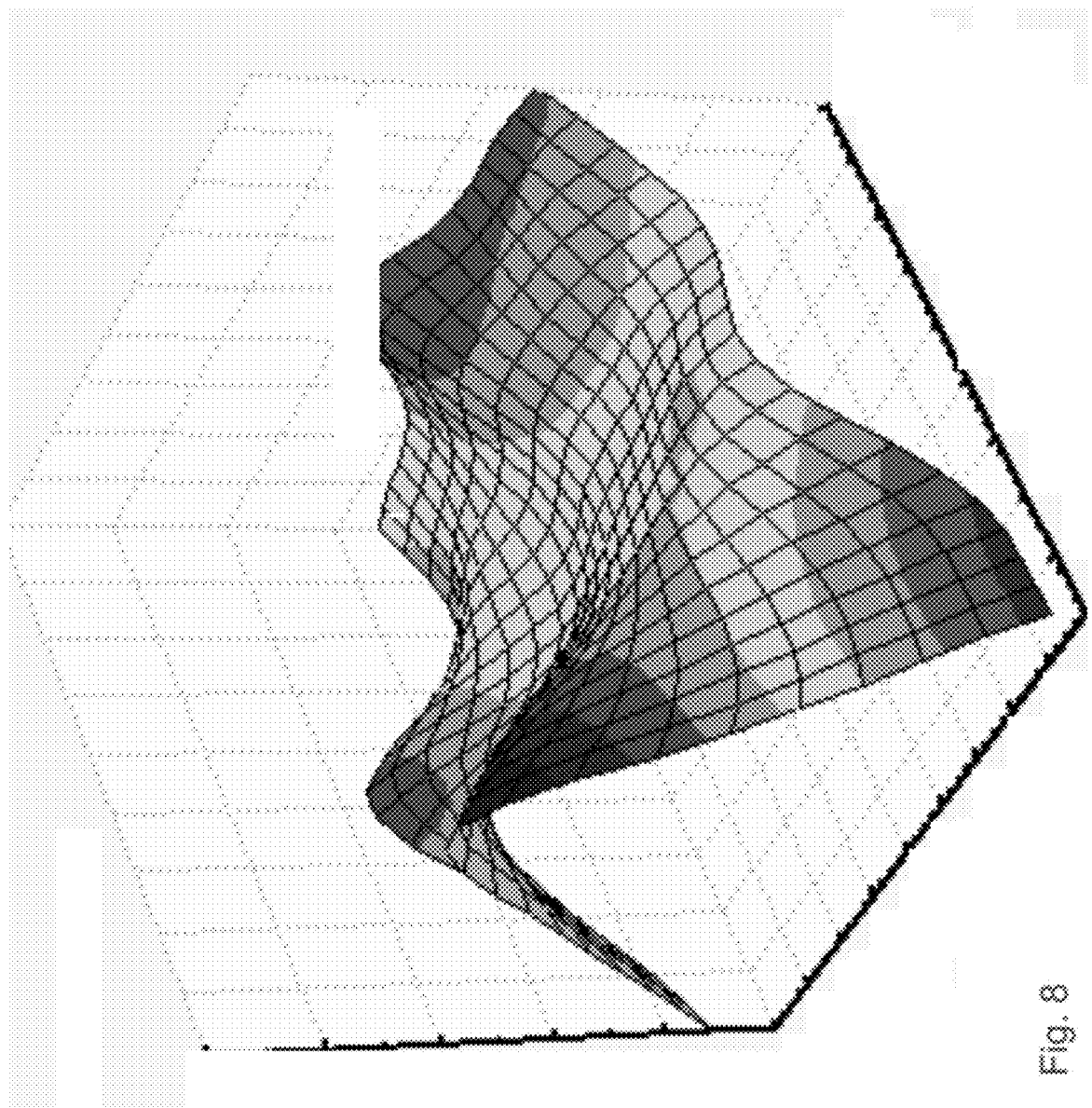
FIG. 8 is an example of a graphical representation of a response to a user request according to an embodiment of the present invention.

An example of a graphical representation of the response is depicted in FIG. 8. In this case, the response is depicted as a 3-D surface. However, it will be appreciated that the response may be a function of numerous interrelated parameters, and may therefore involve a 2-D, 3-D or n-D graphical representation The user interface 82 and screen are arranged to receive user inputs to thereby allow the user to interact with the displayed response. For example, in the case of the first example above, the response to the query of "How many sales enquiries are not being converted into sales", might be a graphical display of the percentage of sale enquires not being converted into actual sales over a given period of time, such as a 24 hour period. The user might wish to increase the number of converted sales during an evening period and accordingly, interact with the graphical display by selecting the curve of the graphical representation and drawing it towards the x-axis.

This modification of the graphical representation is measured and data indicative of the modification is sent 724 to the computational engine 88. The computational engine 88 identifies factors influencing the modification and sends 726 a request to the keyword adaptor to prompt a change in the relevant contact center configuration. The keyword adaptor then makes 728 the necessary change to the contact center configuration. In this way, the user can reconfigure the representation of the response to the request to thereby fine-tune the contact center to cater to specific business needs at that time without the need for the user to understand the actual configuration of the contact center.

In the case of the above example, the data to be sent to the computational engine is determined from the user's modification of the sales data representation to be a 5% increase in converted sales during the evening period. The computational engine 88 may determine that converted sales could be increased by 5% during the evening period by providing agents working at this time with additional training. Accordingly, the computational engine will instruct the keyword adaptor to schedule additional training for those agents. Alternatively, it might be determined that converted sales could be increased by 5% during the evening period by increasing a number of agents working during that period, thereby enabling the agents to spend more time dealing with each contact. Accordingly, the computational engine 88 will instruct the keyword adaptor 86 to hire or schedule more agents to work during that period.

In another example, a user may request information relating to sales of insurance policies, and a 3-D representation of the response generated by the computational engine 88 might display a graph of a relationship between $ sales of insurance, talk time, and agent priority, which might indicate for example that higher priority agents are spending more time on calls, and are accordingly making more $ sales. The user need not necessarily understand the relationship between the metrics but nonetheless, can understand that an increase in the $ sales can be achieved by adjusting the curve of the graph. The computational engine 88 deduces from this modification and considering the relationship that exists between the metrics of the graph, that based on the current availability, the number of agents with a priority in the sales skill set need to be increased in order to achieve the desired increase in $ sales. The computational engine will then instruct the keyword adaptor 86 to alter the contact center configuration accordingly.

It will be appreciated that the limitations may be imposed on the user, preventing them from making unsafe or impossible modifications to the displayed representation of a response to their request, and accordingly to the contact center configuration. Furthermore, the computational engine 88 is capable of determining other operations of the contact center, which might be adversely affected by the user's modification. In one embodiment, such adversely affected operations will be signaled to the user as a warning. In the preferred embodiment, the user can decide whether to cancel the modification or alternatively to override the warning and proceed with the modification to the contact center configuration.

In the case that modification to the contact center configuration is restricted for a desired modification, the computational engine is arranged to provide, where appropriate alternative suggestions in order to achieve the desired result. For example, where a limited number of available agents precludes agents from being transferred from a first skill set to a second skill set, the computational engine might suggest that instead certain agents be trained in the second skill, and provide a link to a web service arranged to provide such training to thereby enable the user to schedule training at that time.

In this way, the computational engine performs as a business advisor, capable of accessing vast volumes of real, empirical data and providing accessible representations of this data.

It may also be the case that the computation engine is unable to achieve exactly the modification desired, perhaps due to constraints on the system or inaccuracies in the model it employs. Nevertheless it can identify a parameter which, when adjusted, will bring the actual performance of the contact center closer to the desired state indicated by the user's modification of the representation, and changes can be made to the contact center configuration which help achieve some degree of the required result.

The invention is not limited to the embodiment(s) described herein but can be amended or modified without departing from the scope of the present invention.

What is claimed is:

1. A system for adapting a contact center configuration in order to achieve a specific business goal, the system comprising:
   a display for displaying to a user a representation of an actual state of a performance metric of the contact center, the representation taking a form of an n-dimensional graphical representation, where n is an integer greater than or equal to 2;
   an interactive tool for enabling the user to interact with and thereby modify the n-dimensional graphical representation of the performance metric to a desired state;
   a computation engine arranged to:
      determine a measure of the modification of the n-dimensional graphical representation;
      identify at least one contact center configuration parameter, which if adjusted, will result in an update of the actual state of the performance metric which more closely approaches the desired state represented by the modification.

2. The system of claim 1 wherein the computational engine is further arranged to update the representation of the actual state of the performance metric, which more closely approaches the desired state represented by the modification.

3. The system of claim 1 wherein the computation engine is further arranged to determine the adjustment of the contact center configuration parameter required to cause the actual state of the performance metric to more closely approach the desired state represented by the modification.

4. The system of claim 1 wherein the display is arrange to depict at least one boundary, which limits the modification of the representation beyond the boundary.

5. The system of claim 1 wherein the computation engine is arranged to adjust the contact center configuration parameter to cause the actual state of the performance metric to more closely approach the desired state represented by the modification.

6. The system of claim 1 furthering comprises a user interface for receiving requests from the user relating to the specific business goal, wherein the representation of the actual state of the performance metric of the contact center is associated with the request.

7. The system of claim 6 further comprising a statement analyser, wherein the statement analyser is arranged to receive the request from the user interface and to parse the request to identify a set of keywords.

8. The system of claim 7 further comprising a keyword analyser, wherein the keyword analyser is arranged to receive the set of keywords from the statement analyzer and to fetch data associated with the keywords.

9. The system of claim 8 wherein the data is fetched from at least one of a contact center configuration database, a customer relationship management database, and a reporting and statistics function.

10. The system of claim 9 wherein the data is provided to the computation engine to facilitate the determination of the representation of the performance metric.

11. The system of claim 1 wherein the computation engine is arranged to render the representation of the actual state of the performance metric for display to the user.

12. The system of claim 8 wherein the keyword analyser is arranged to receive the at least one contact center configuration parameter and the adjustment required from the computational engine, and to modify the contact center configuration accordingly.

13. A computer-implemented method of adapting contact center configuration in order to achieve a specific business goal, the method carried out by a computing system of a contact center and comprising:
   displaying to a user, a representation of an actual state of a performance metric of the contact center, the representation taking a form of an n-dimensional graphical representation, where n is an integer greater than or equal to 2;
   responsive to the user interacting with and modifying the n-dimensional graphical representation, determining a measure of the modification of the representation to a desired state; and
   identifying at least one contact center configuration parameter, which if adjusted, will result in an update of the actual state of the performance metric which more closely approaches the desired state represented by the modification.

14. A computer program product comprising a non-transitory, tangible computer readable medium encoded with computer executed instructions, which when executed in a computing device, is arranged to carry out the following steps:
   display to a user, a representation of an actual state of a performance metric of the contact center, the representation taking a form of an n-dimensional graphical representation, where n is an integer greater than or equal to 2;
   responsive to the user interacting with and modifying the n-dimensional graphical representation to a desired state, determine a measure of the modification of the representation; and
   identify at least one contact center configuration parameter, which if adjusted, will result in an update of the actual state of the performance metric which more closely approaches the desired state represented by the modification.

* * * * *